United States Patent [19]

Shigeta et al.

[11] Patent Number: 5,434,689
[45] Date of Patent: Jul. 18, 1995

[54] DIELECTRIC MIRROR OF SPATIAL LIGHT MODULATOR HAVING SILICON LAYERS CONTAINING OXYGEN AND PRODUCTION METHOD

[75] Inventors: Masanobu Shigeta, Yokosuka; Shigeo Shimizu, Yokohama, both of Japan

[73] Assignee: Victor Company of Japan, Ltd., Yokohama, Japan

[21] Appl. No.: 77,568

[22] Filed: Jun. 15, 1993

[30] Foreign Application Priority Data

Jun. 16, 1992 [JP] Japan .................. 4-181835

[51] Int. Cl.⁶ .................. G02F 1/1335; G02B 1/10
[52] U.S. Cl. .................. 359/71; 359/584
[58] Field of Search .............. 359/71, 584, 585, 586, 359/587; 372/11, 8

[56] References Cited

U.S. PATENT DOCUMENTS

| | | | |
|---|---|---|---|
| 3,824,002 | 7/1974 | Beard | 350/160 LC |
| 4,009,453 | 2/1977 | Mahlein | 331/94.5 C |
| 5,056,895 | 10/1991 | Kahn | 359/87 |
| 5,076,670 | 12/1991 | Sayyah | 359/72 |
| 5,084,777 | 1/1992 | Slobodin | 359/67 |
| 5,126,880 | 6/1992 | Wheatley et al. | 359/587 |
| 5,150,236 | 9/1992 | Patel | 359/71 |
| 5,155,609 | 10/1992 | Konno et al. | 359/71 |
| 5,272,554 | 12/1993 | Ji et al. | 359/67 |

FOREIGN PATENT DOCUMENTS 3-107818 5/1991 Japan.

OTHER PUBLICATIONS

Applied Physics Letter, vol. 22, No. 3, Feb. 1973, Beard et al. AC Liquid-Crysteal Light Valve.

Primary Examiner—Anita Pellman Gross
Assistant Examiner—Charles Miller
Attorney, Agent, or Firm—Michael N. Meller

[57] ABSTRACT

A dielectric mirror of a spatial light modulator having a photoconductive layer on which an image is written by a writing light carrying an image information and a photomodulator layer through which the written image is read out by irradiating a reading light and by reflecting the reading light with the dielectric mirror. The dielectric mirror is constructed by laminating plural kinds of layers respectively having different values of refractive indexes, for instance, Si layers and $SiO_2$ layers. The resolution of the spatial light modulator degrades when an oxygen content rate in the Si layers becomes below a certain amount, on the contrary, the contrast ratio of the spatial light modulator degrades when the oxygen content rate in the Si layers becomes above a certain amount. The Si layers of the present invention have an oxygen content rate ranging from 10 to 40 atom %, preferably ranging from 15 to 35 atom %.

3 Claims, 4 Drawing Sheets

Fig.1 (A) PRIOR ART
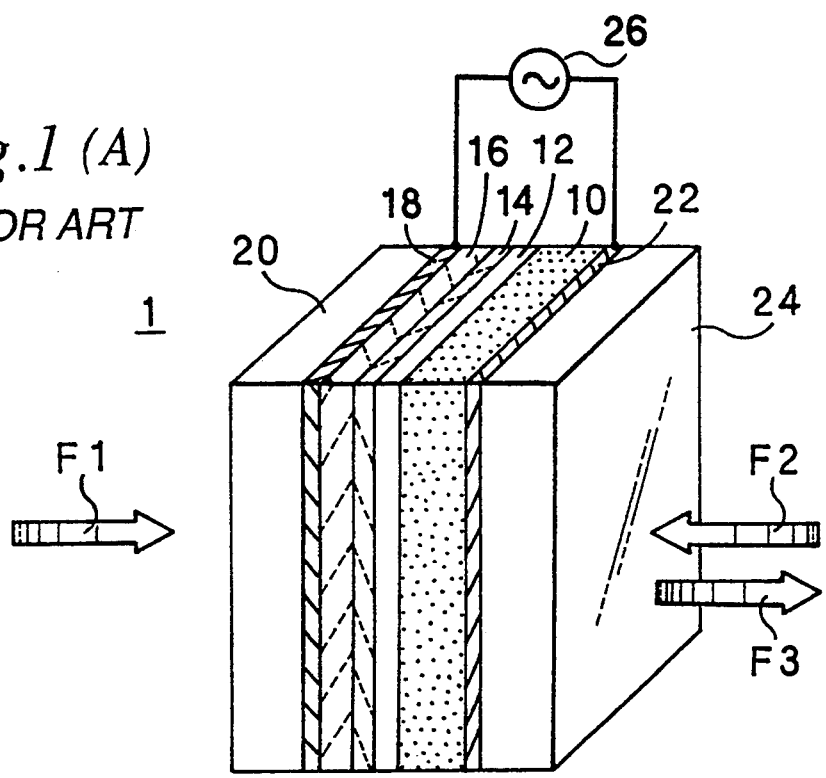
Fig.1 (B) PRIOR ART
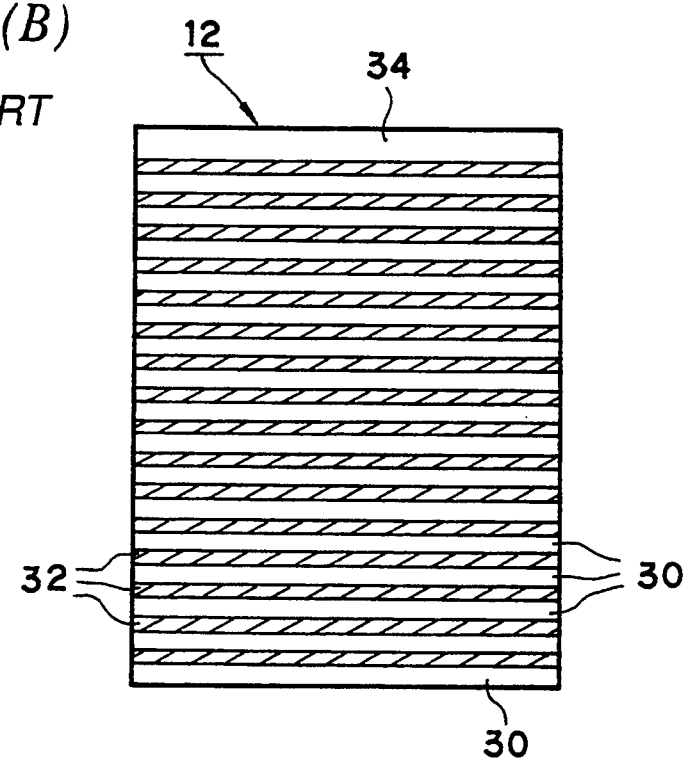

DIELECTRIC MIRROR OF SPATIAL LIGHT MODULATOR HAVING SILICON LAYERS CONTAINING OXYGEN AND PRODUCTION METHOD

BACKGROUND OF THE INVENTION

1. Field of the Invention

The present invention relates to a dielectric mirror of a reflecting type spatial light modulator used for a flat panel display, an optical arithmetic element and a video-projector and so on, and particularly relates to improvements of display quality of the spatial light modulator and mass-productivity of the dielectric mirror.

2. Description of the Related Art

As well known in the art, it is able to perform an incoherent-coherent conversion or a coherent-incoherent conversion of light by using a spatial light modulator, thus, there is proposed many applications to utilize the spatial light modulator such as a data parallel processing and a direct arithmetic processing of images. Further, the spatial light modulator is applicable to a display system such as a video projector by amplifying the intensity of image.

As a spatial light modulator like this, for instance, there is a type disclosed in Japanese Patent Laid Open 58-215626/1983 also in Appl. Phys. Lett., Vol. 22, No. 3, 1 February 1973, which is shown in FIG. 1 (A), FIG. 1 (A) is a perspective view showing a construction of a reflecting type spatial light modulator 1 of the prior art, the general construction of which is employed in a spatial light modulator used in the present invention.

Referring to FIG. 1 (A), numerals 20, 24, designate glass substrates, and 18, 22, transparent electrodes interposed between the glass substrates 20, 24. At a side of the transparent electrode 18 from which a writing light impinges in a direction of an arrow F1, a photoconductive layer 16, a light-blocking layer 14 of an insulator, and a dielectric mirror 12 are laminated in the order. At another side of the transparent electrode 22 from which a reading light impinges in a direction of an arrow F2, a photomodulator layer 10 is formed. Further, an AC power source 26 is connected to the transparent electrodes 18, 22.

Next, the description is given to an operation of the above spatial light modulator 1.

In the operation, an AC voltage is supplied across the transparent electrodes 18, 22 from the AC power source 26. Under this condition, in general, if a light is irradiated to the photoconductive layer 16 in a direction shown by the arrow F1, the impedance of the photoconductive layer 16 is reduced in proportion to intensity distribution of the light or image, so that an AC voltage is applied to the photomodulator layer 10 according to thus reduced impedance distribution of the photoconductive layer 16.

Therefore, when a writing light carrying image information impinges on the photoconductive layer 16 in a direction shown as an arrow F1, a two-dimensional distribution of the AC voltage is applied to the photomodulator layer 10 corresponding to the two-dimensional distribution of intensity of the image information.

On the other hand, a reading light impinges on the photomodulator layer 10 in a direction shown as an arrow F2.

Accordingly, the reading light incident to the photomodulator is modulated in the photomodulator layer 10 to which the two-dimensional distribution of the electric field is applied corresponding to the two-dimensional distribution of intensity of image information carried by the writing light. The reading light reflected by the dielectric mirror 12 is again modulated in the photomodulator layer 10 when it passes therethrough, and exits out of the spatial light modulator 1 outputted toward outside in a direction shown as an arrow F3.

In the case of using a crystal structure or a liquid crystal having with a support body (for instance, a liquid crystal film) as the photo-modulator layer 10, a part of glass substrates or whole of it may be omitted. Further, the light-blocking layer 14 is optionally provided for preventing the reading light from leaking into the photoconductive layer 16 through the dielectric mirror 12 and from disturbing a two-dimensional distribution of the image charges formed in the photoconductive layer 16, otherwise such leakage would cause a reduction of the contrast ratio of the reproduced image.

As mentioned in the foregoing, a reflecting device for the reading light is indispensable to the reflecting type spatial light modulator 1. In principle, a conductive material such as a metal layer which blocks the electric field to be applied to the photoconductive layer 10 can not be employed as the reflecting device of the reading light. For this reason, the dielectric mirror 12 is employed as the reflecting device.

FIG. 1(B) is a sectional view showing a construction of a dielectric mirror of a prior art.

Generally, a dielectric mirror has a laminated construction of a first group of dielectric layers having lowrefractive indexes and a second group of dielectric layers having high refractive indexes laminated alternately, a thickness of each layer being determined to be $\lambda/4$ ($\lambda$=wavelength) of the reading light. The thickness of each layer is expressed in an optical thickness thereof throughout the present specification.

Referring to FIG. 1(B), in this prior art, a dielectric mirror 12 is constructed by alternately laminating a number of low refractive index layers 30 of $SiO_2$ as the first group and a number of high refractive index layers 32 of $TiO_2$ as the second group, and further laminating a low refractive index layer 34 having $\lambda/2$ of the reading light on the top of the laminated construction.

In this dielectric mirror 12, the larger the numbers of laminated layers, the higher the reflectivity of the dielectric mirror 12, this means, the lower the transmittance of the dielectric mirror 12. However, if the wavelength of the reading light deviates from a designed wavelength of a spectral characteristic, the reflectivity of the dielectric mirror 12 will decrease, i.e., the transmittance thereof will increase. Therefore, it needs the light-blocking layer for blocking the reading light even when the intensity of the reading light is weak, except the case of using a monochromatic reading light. It is able to increase the reflectivity of the dielectric mirror 12 with respect to the reading light by substantially increasing the numbers of the laminated layers, however, it poses a problem of causing a reduction of productivity because of a thickness increase of more than a few $\mu$m. In the case of using such a dielectric mirror with the reading light having a strong intensity for a video-projector, it will inevitably require a light-blocking layer of as thick as 1–10 $\mu$m.

When the thickness of the light-blocking layer 14 and/or the dielectric mirror 12 becomes large, it requires a high driving voltage of the AC power source 26 thus causes a loss of the AC power source 26 from which the two-dimensional electric filed is applied to the photomodulator layer 10 corresponding to the change of conductivity of the photoconductive layer 16. This poses problems of degrading the contrast ratio and a resolution of the reproduced image, the latter is due to remoteness of the photomodulator layer 10 from the photoconductive layer 16 so that the electric field therefrom diverges at the photomodulator layer 10.

As a countermeasure to these problems, there disclosed a dielectric mirror in Japanese Patent Publication 3-217825/1991, wherein improvements of the contrast ratio and the resolution of the reproduced image are obtained by constructing the dielectric mirror from a first laminated portion having a light absorbing characteristic and a second laminated portion having a light reflective characteristic so as to have a function of the light-blocking layer.

Further, in Preprint for the 51th Meeting (1990) of the Japan Society of Applied Physics, page 751, the paper 26a-H3, or in U.S. Pat. No. 5,084,777, there is disclosed a dielectric mirror of Si—Ge alloy having a high refractive index and a large light absorbability.

However, the former poses a problem of obtaining a dielectric mirror having a high electric resistivity because of employing an Si layer therein, and the latter poses a problem of requiring a high cost for the materials to be used and for the production equipment as well as a problem of low productivity.

SUMMARY OF THE INVENTION

Accordingly, a general object of the present invention is to provide a dielectric mirror of a spatial light modulator and the production method of the dielectric mirror in which the above disadvantages have been eliminated.

More specific object of the present invention is to provide a dielectric mirror of a spatial light modulator capable of obtaining a reproduced image having an excellent contrast ratio and a high resolution.

Another and more specific object of the present invention is to provide a dielectric mirror of a spatial light modulator having a photoconductive layer on which an image is written by a writing light carrying an image information and a photomodulator layer through which the written image is read out by irradiating a reading light thereon and by reflecting the reading light with the dielectric mirror, the dielectric mirror being constructed by laminating a plurality of different kinds of layers respectively having different values of refractive indexes, and at least one of the plurality of different kinds of layers being made of Si layers having an oxygen content rate ranging from 10 to 40 atom %.

Other objects and further features of the present invention will be apparent from the following detailed description and accompanying drawings.

DETAILED DESCRIPTION OF THE PREFERRED EMBODIMENT

An embodiment of a dielectric mirror of a spatial light modulator according to the present invention will be described with reference to the drawings.

[Embodiment 1]

Figure 2:
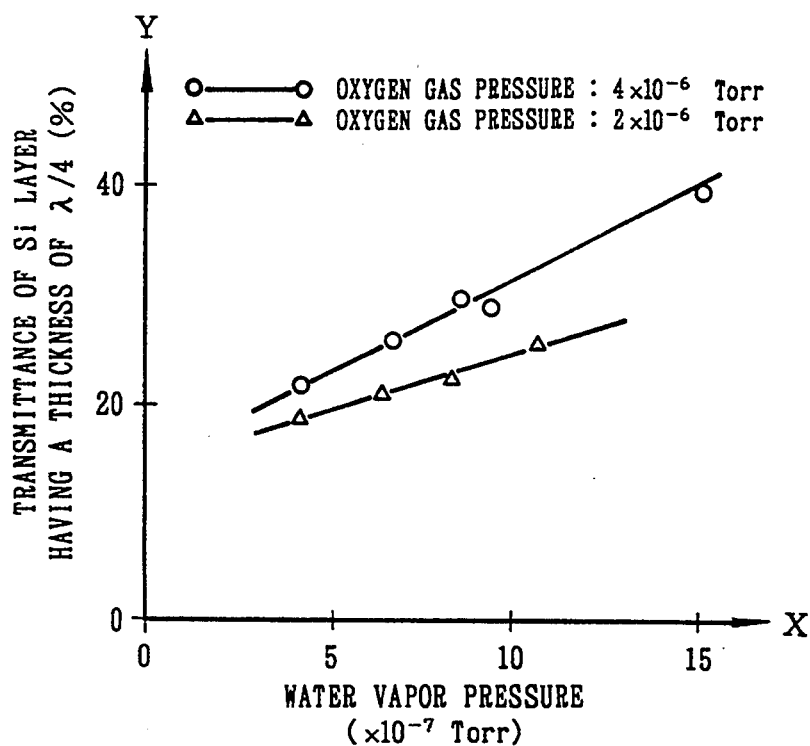
FIG. 2 is a graph showing measurement results of a transmittance of an Si layer having a thickness $\lambda/4$ in relation to a water vapor pressure introduced into a vacuum chamber in the Si layer forming process when an oxygen pressure is varied, wherein the Si layer is a constructive component of a dielectric mirror and the $\lambda$ is a wave length of a reading light.
Figure 3:
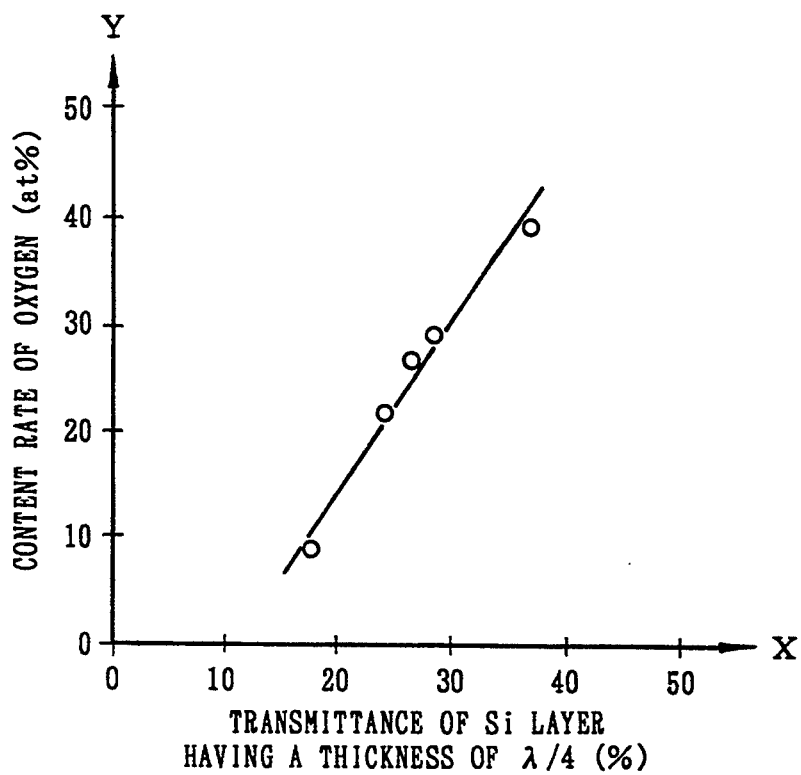
FIG. 3 is a graph showing measurement results of a transmittance of the Si layer having a thickness of $\lambda/4$ in relation to an oxygen content rate (atom %) of the Si layer, wherein the Si layer is the constructing component of a dielectric mirror and the X is the wavelength of the reading light.
Figure 4:
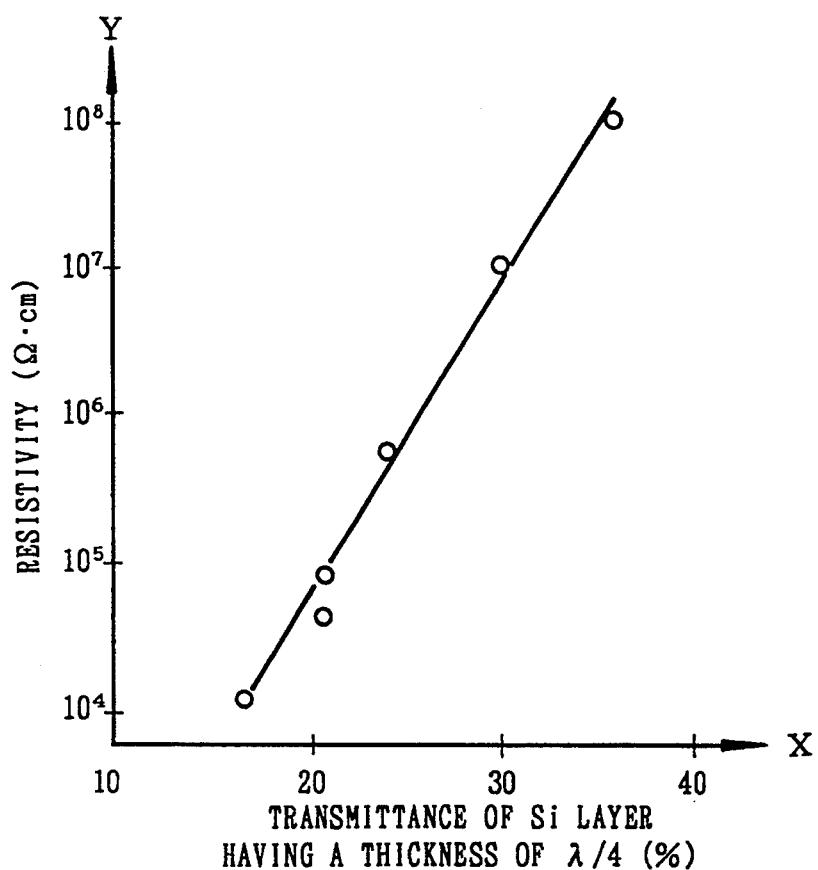
FIG. 4 is a graph showing measurement results of a resistivity (specific resistance, $\Omega$ cm) of the Si layer having a thickness of $\lambda/4$ in relation to a transmittance of the Si layer, wherein the Si layer is the constructing component of a dielectric mirror and the $\lambda$ is the wavelength of the reading light.

At first, a description is given to Embodiment 1 of the present invention referring to FIGS. 2 through 4, wherein a production method of the dielectric mirror of the present invention is described.

As will be described hereafter in Embodiment 2, a dielectric mirror of a spatial light modulator 40 of the present invention, as shown in FIG. 1(C) is constructed by alternately laminating plural Si layers each containing 10~40 atom % oxygen and plural $SiO_2$ layers disposed on a glass substrate by a vacuum vapor deposition method employing an electron beam heating in a vacuum chamber with introducing oxygen gas and water vapor therein.

Next, a description is given to a transmittance of an Si layer having a thickness of $\lambda/4$ in relation to a water vapor pressure introduced in the vacuum chamber when an oxygen pressure is varied therein, wherein the $\lambda$ is a wavelength of a reading light.

As clearly understood from FIG. 2, a relation between the transmittance of the Si layer and the water vapor pressure is approximately proportional, and the gradient of the graph changes depending on the amount of introduced oxygen. Therefore, it requires not only the control of the oxygen gas pressure but also the control of the water vapor pressure to obtain the Si layer having a predetermined transmittance.

In general, in a vacuum equipment, there exists a back-pressure therein even when pumping is sufficiently conducted, and the back-pressure is mostly due to an amount of water vapor. Usually, in the vacuum vapor deposition method, a level of the back-pressure changes during the process of deposition. Therefore, as mentioned in the foregoing, it is unable to obtain the Si layer having a predetermined transmittance by controlling only the amount of the oxygen gas pressure. On the other hand, it will be understood from the measuring result of FIG. 2 that it is able to obtain the Si layer having a high transmittance by introducing a high water vapor pressure in the vacuum chamber in the Si layer forming process even when the introduced oxygen gas pressure is low therein.

Next, a description is given to a relation between transmittance and an oxygen content rate (atom %) of an Si layer having a thickness of $\lambda/4$ ($\lambda=540$ nm). The measurement of the oxygen content rate was conducted by using XPS (ESCA, electron spectroscopy for chemical analysis). As seen from the measurement result of FIG. 4, the relation between the transmittance and the oxygen content rate (atom %) is approximately proportional.

Next, a description is given to a relation between a resistivity (specific resistance, $\Omega$ cm) and a transmittance of the Si layer having thickness $\lambda/4$ referring to FIG. 4, wherein the Y axis of the resistivity is expressed with a logarithmic scale. As will be understood from the measuring result of FIG. 4, the relation between the transmittance and the resistivity is approximately proportional. In other words, the higher the light-blocking characteristic, the lower the resistivity, i.e., the light-blocking characteristic is inversely proportional to the resistivity. Embodiment [2]

Next, a description is given to an embodiment of the dielectric mirror employing the Si layer produced by using the production method mentioned in the foregoing.

The construction of the spatial light modulator 40 employed in this embodiment is similar to that of the prior art shown in FIG. 1(A) and is illustrated in FIG. 1(C), thus the description of the construction of the spatial light modulator 40 is omitted for simplicity, and identical components to those of the described conventional example are depicted by identical characters without a detailed explanation thereof.

At first, the photoconductive layer 16 of a-Si:H (hydrogenerated amorphous silicon) was formed on a transparent electrode 18 of an ITO layer which is formed on the glass substrate 20 by CVD (Chemical Vapor Deposition) method. On the photoconductive layer 16, a dielectric mirror 13 (corresponding to 12) of the present invention which functions as a mirror and a light-blocking layer, is formed in such a manner that eight layers of $SiO_2$ each having thickness of $\lambda/4$ and eight layers of Si each having the same thickness are alternately laminated, i.e., a total lamination of sixteen layers, and an $SiO_2$ layer having a thickness of $\lambda/2$ is formed on top of the laminated structure.

In this case, the formation of the $SiO_2$ layers for the dielectric mirror was performed by the oxygen-ion beam assist vapor deposition method and the formation of the Si layers was performed according to the production method of the Embodiment 1.

In order to confirm the characteristic difference of the spatial light modulator derived from the production condition of the Si layers, the samples 1~4 of which respective Si layers had different oxygen content rates (Oxy. cont. rate), were

TABLE 1

| sample No. | W.V pressure (Torr) | Oxy. gas press. (Torr) | Oxy. cont. rate (atom %) |
|---|---|---|---|
| 1 | $5 \times 10^{-7}$ | — | 9 |
| 2 | $7 \times 10^{-7}$ | $2 \times 10^{-6}$ | 17 |
| 3 | $1 \times 10^{-6}$ | $4 \times 10^{-6}$ | 27 |

TABLE 1-continued

| sample No. | W.V pressure (Torr) | Oxy. gas press. (Torr) | Oxy. cont. rate (atom %) |
|---|---|---|---|
| 4 | $5 \times 10^{-7}$ | $1 \times 10^{-5}$ | 36 | obtained by varying the forming condition of the Si layers, i.e., the water vapor pressure (W.V. pressure) and the oxygen gas pressure (Oxy. gas press.) as shown in Table 1.

For each sample prepared in the process mentioned previously, the glass substrate 24 deposited with an ITO layer as the transparent electrode 22 was prepared separately.

Figure 1:
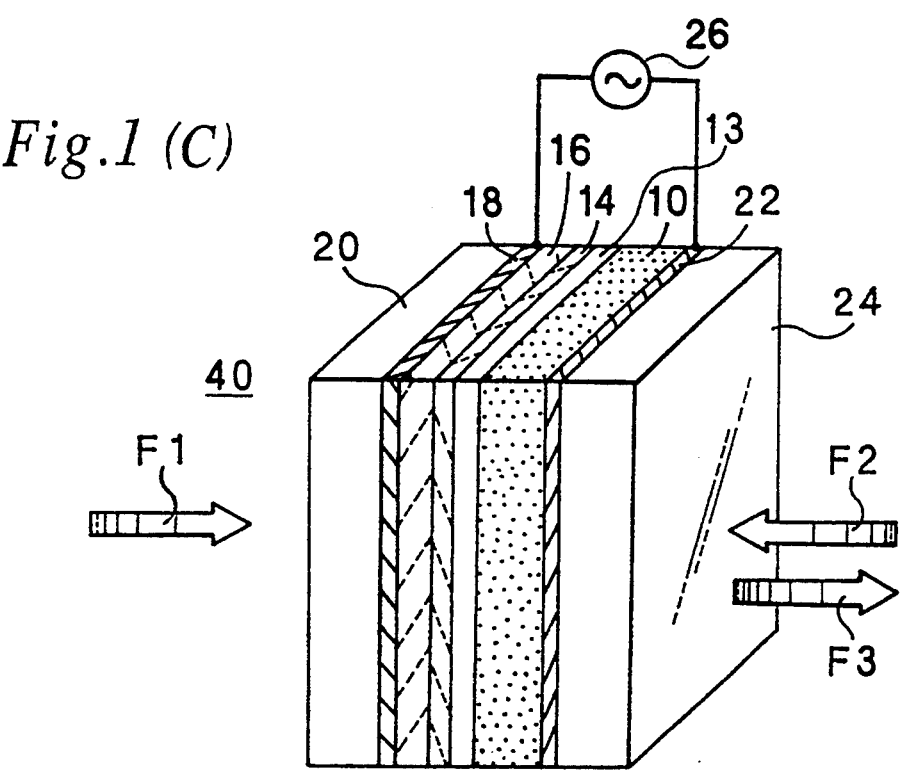
FIG. 1(A) is a perspective view showing a construction of a reflecting type spatial light modulator of prior art, a general construction of which is employed in a spatial light modulator used in the present invention.
FIG. 1(B) is a sectional view showing a construction of a dielectric mirror of prior art.
FIG. 1(C) is a perspective view of a reflecting type spatial light modulator constructed in accordance with an embodiment of the present invention.

The transparent electrode layer 22 of the substrate 24 and the mirror 13 of the substrate 20 were processed for alignment of liquid crystal for each sample. Thus prepared glass substrates 20 and 24 were interfaced each other at the dielectric mirror 13 and the transparent electrode 22 respectively, between which spacers (not shown) were interposed to form a cell to be filed with a liquid crystal material as the photoconductive layer 10. Accordingly, each sample of the reflecting type spatial light modulator 40 as shown in FIG. 1 (C) was assembled.

The samples 1~4 of reflecting type spatial light modulators 40 were obtained by injecting nematic crystal as the photomodulator layers 10 in the cell of every samples. It should be noted that in this embodiment the light-blocking layer 14 does not exist independently unlike in the prior art shown in FIG. 1(A) because the dielectric mirror 13 of this embodiment serves both functions of the dielectric mirror 12 and the light-blocking layer 14 in the prior art.

Concerning the spatial light modulator of the above samples, resolutions and contrast ratios were measured by writing and reading images on and from the samples of the spatial light modulator. As a light source of the writing light, an LED array was used, of which center wavelength was 680 nm. Further, as a light source of the reading light, a xenon lamp was used. The light having a center wavelength of 540 nm and a half value of 60 nm obtained by filterring the the light source was used as a reading light. The intensity ratio of the reading light to the writing light was approximately 100,000:1. The frequency of the AC power source 26 was 5 KHz. The measurement results are shown in Table 2.

TABLE 2

| sample No. | resolution ($\mu$m) | contrast ratio |
|---|---|---|
| 1 | 15 | 20:1 |
| 2 | 8 | 20:1 |
| 3 | 8 | 20:1 |
| 4 | 8 | 15:1 |

Figure 5:
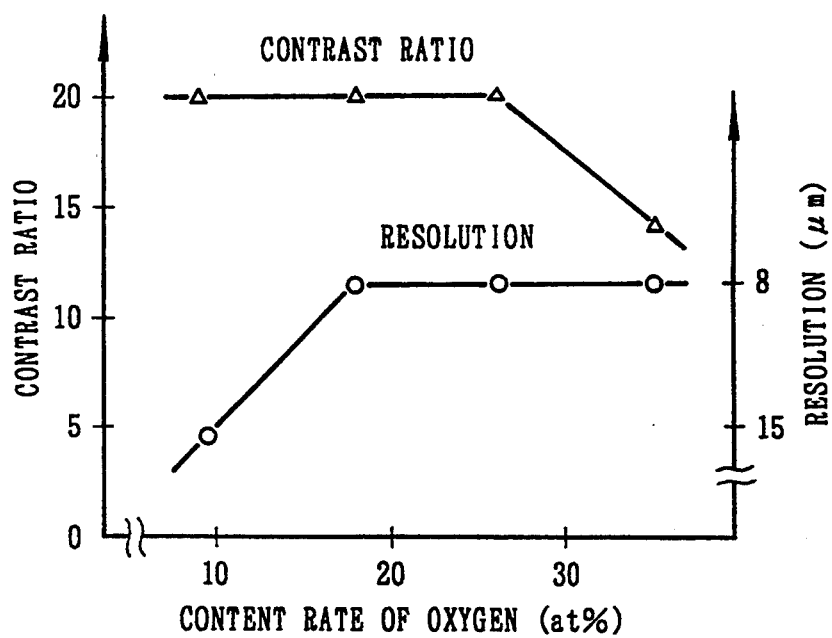
FIG. 5 is a graph showing measurement results of a contrast ratio and a resolution in relation to an oxygen content rate of an Si layer having a thickness of $\lambda/4$, which is obtained from Table 1 and Table 2, wherein the Si layer is a constructing component of a dielectric mirror and the $\lambda$ is the wavelength of the reading light.

FIG. 5 is a graph showing measurement results of a contrast ratio and a resolution in relation to an oxygen content rate of Si layers each having a thickness of $\lambda 4$, which is obtained from Table 1 and Table 2, wherein the Si layers are a constructing component of the dielectric mirror and the $\lambda$ is a center wavelength of the reading light (540 nm).

As shown in FIG. 5, it can be understood that the samples of the Si layers having the oxygen content rates ranging form 15 to 35 atom % are excellent of the contrast ratio and the resolution. However, the resolution of the spatial light modulator begins to degrade at the oxygen content rate of 9 atom %. This reason is considered to be due to the reduction of the resistivity of the Si layer. The resistivity of the Si layer decreases in correspondence with the decrease of the oxygen content rate as shown in FIGS. 3 and 4. Therefore, it is preferable to employ the Si layer having the oxygen content rate of no less than 10 atom %.

On the other hand, the contrast ratio of the spatial light modulator begins to degrade at the oxygen content rate of 36 atom %. This reason is considered to be due to the increase of the transmittance corresponding to the oxygen content rate of the Si layer, which causes a degradation of the light-blocking characteristic. However, it is able to improve the light-blocking characteristic in some degrees by increasing the number of the laminations of the dielectric mirror because the resolution is not degraded. But, an excessive increase of oxygen content rate of 50 atom % (a state of SiO) requires a large number of the laminations of the dielectric mirror, this causes a degradation of the resolution. Thus, it is preferable to employ the Si layer having the oxygen content rate of less than 40 atom %.

As mentioned in the foregoing, it is able to obtain the dielectric mirror presenting an excellent resolution and light-blocking characteristic by employing an Si layer having the oxygen content rate ranging from 10~40 atom %, preferably ranging form 15~35 atom %.

Further, it is able to control the oxygen content rate successfully by introducing an amount of water vapor in the layer forming process.

Further more, it is possible to improve the productivity of the spatial light modulator by employing approximately the same method of $SiO_2$ for forming the Si layer.

[Other Embodiments]

The present invention is not limited to the above embodiments, but the present invention may be modified as follows.

(1) In the Embodiment 2, 17 layers of laminations are employed for the dielectric mirrors, however, other number of layer can be employed optionally.

(2) In the Embodiment 2, a-Si:H is employed as a material of the photoconductive layer 16 and nematic liquid crystal is employed as a material of the photomodulator layer 10, however, other materials may be employed instead of the nematic liquid crystal optionally.

What is claimed is:

1. A dielectric mirror for a reflective spatial light modulator having a photoconductive layer on which an image is written by a writing light carrying an image information and a photomodulator layer through which the written image is read out by irradiating a reading light thereon and by reflecting the reading light with the dielectric mirror, said dielectric mirror being constructed by laminating plural kinds of layers respectively having different values of refractive indexes, and at least one of the plural kinds of layers being made of Si layers having an oxygen content rate ranging from 10 to 40 atom %.

2. A dielectric mirror of a spatial light modulator as claimed in claim 1, wherein one of the plural kinds of layers is made of $SiO_2$ layers.

3. A production method for the dielectric mirror of a reflecting type spatial light modulator having a photoconductive layer on which an image is written by a writing light carrying an image information and a photomodulator layer through which the written image is read out by irradiating a reading light thereon and by reflecting the reading light with the dielectric mirror, said dielectric mirror being constructed by laminating plural kinds of layers respectively having different values of refractive indexes, and at least one of the plural kinds of layers being made of Si layers having an oxygen content rate ranging from 10 to 40 atom %, wherein said Si layers being formed in an atmosphere of a water vapor corresponding to a desired oxygen content rate to be contained in the Si layers.

* * * * *